Patented June 29, 1954

2,682,562

UNITED STATES PATENT OFFICE 2,682,562

REDUCTION OF AROMATIC CARBINOLS

Irving Wender and Milton Orchin, Pittsburgh, Pa., assignors to the United States of America as represented by the Secretary of the Interior No Drawing. Application May 10, 1951, Serial No. 225,659

9 Claims. (Cl. 260—612)

(Granted under Title 35, U. S. Code (1952), sec. 266)

The invention herein described and claimed may be manufactured and used by or for the Government of the United States of America for governmental purposes without the payment of royalties thereon or therefor.

This invention relates to the reduction of the oxygen-containing group in certain oxygenated aromatic compounds in the presence of a homogeneous hydrogenation catalyst.

Procedures for the reduction of organic compounds in the presence of heterogeneous hydrogenation catalysts have long been known to have a number of disadvantages and limitations. Many of the more effective hydrogenation catalysts such as Raney nickel are rather expensive and tedious to prepare. Likewise, since the surfaces of heterogeneous hydrogenation catalysts are subject to poisoning by relatively small amounts of impurities, such as by sulfur and carbon monoxide, only pure feed stocks and carefully purified hydrogenating gases can be employed.

It is an object of the invention to provide a method for the reduction of certain oxygenated aromatic compounds which is free from the disadvantages and limitations connected with the use of heterogeneous hydrogenation catalysts. More particularly, the object of the present invention is to provide a method for completely reducing the oxygen-containing group in certain oxygenated aromatic compounds in the presence of a homogeneous hydrogenation catalyst which is easily prepared, and which is immune to poisoning by sulfur, carbon monoxide, and the other poisons which deactivate the surfaces of heterogeneous hydrogenation catalysts. These and other objects of the invention will be apparent from the description which follows.

In accordance with the invention, it has been found that the oxygen-containing group in aromatic aldehydes, aromatic ketones, and aromatic alcohols wherein the oxygen atom of the oxygen-containing group is attached to a carbon atom $\alpha$ to an aromatic nucleus, can be reduced to the completely hydrogenated state when these compounds are reacted with hydrogen in the presence of a carbonyl of cobalt or iron at an elevated temperature and pressure while maintaining a concentration of carbon monoxide in the reaction zone sufficient to prevent decomposition of the metal carbonyl catalyst. In the case of aromatic aldehydes and ketones, the general reaction may be represented as follows:

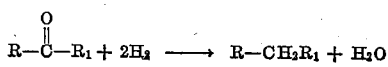

where R is an aromatic radical such as a phenyl, naphthyl, phenanthryl, anthranyl, fluorenyl, or any other radical containing a simple or condensed aromatic nucleus, and where $R_1$ may be hydrogen or an organic radical such as an aryl, alkyl, aralkyl, cycloaliphatic or heterocyclic radical. In the case of the ketones, R and $R_1$ may be condensed into one aromatic radical, as in fluorenone

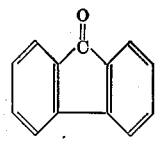

where the keto group C=O, is attached across diphenyl to form the cyclic ketone. The aromatic radical may contain any variety of substituents such as alkyl aryl, cycloaliphatic, heterocyclic (such as thienyl), halide, alkoxy, carboalkoxy, nitro, amino, nitrile, sulfonic acid, and the like.

In the case of aromatic alcohols, the reaction may be represented generally as follows:

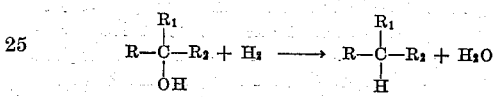

where R and $R_1$ have the same significance as above and where $R_2$ may be hydrogen or an organic radical such as aryl, alkyl, aralkyl, cycloaliphatic or heterocyclic radical, and may be the same as, or different from $R_1$.

In each case, the oxygen atom of the oxygen-containing group must be attached to a carbon atom $\alpha$ to an aromatic nucleus, that is, a nucleus containing benzenoid unsaturation. Thus, in the case of the aldehydes and ketones, the carbon atom of the carbonyl group, C=O, or

as the case may be, must be attached directly to an aromatic nucleus, as in benzaldehyde

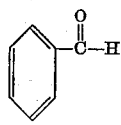

or as in acetophenone

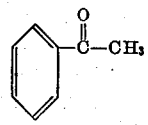

In the case of the aromatic alcohols which undergo reduction in accordance with the invention, the hydroxyl group must be attached to a carbon atom which is attached directly to an aromatic nucleus as in 1-naphthalene methanol

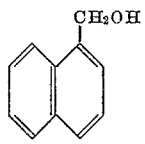

Generally speaking, the side chain containing the oxygenated function may be attached to the aromatic nucleus in any desired position. Of course, where the aromatic radical contains benzenoid unsaturation in a portion of its ring structure, while another portion of the ring structure is non-benzenoid, as in 1,2,3,4-tetrahydro-5-naphthyl carbinol

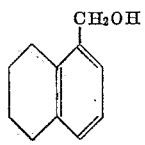

the carbon atom containing the oxygenated function must be attached to that portion of the ring structure containing the benzenoid unsaturation as in the compound given above.

As catalysts for the reaction, either a carbonyl of cobalt or of iron may be employed. Generally, the carbonyls of cobalt are to be preferred since they are less toxic and easier to handle, and likewise generally have higher hydrogenating activity. If desired, the cobalt or iron carbonyl may be prepared in advance of the reaction, and added to the reaction mixture as such. On the other hand, the carbonyl may be formed in situ under the reaction conditions. This may be accomplished by adding the finely divided metal, or an organic or inorganic salt of the metal to the reaction mixture. Under the reaction conditions, the metal or the metallic salt as the case may be, reacts with carbon monoxide present in the reaction zone to form the cobalt or iron carbonyl which is the active catalyst for the reaction.

In the case of cobalt, for example, the catalyst may be added to the reaction mixture as cobalt chloride, cobalt carbonate, cobalt oxide, cobalt acetate, cobalt octoate, or cobalt stearate. From these salts, a cobalt carbonyl will form in the presence of hydrogen and carbon monoxide under the reaction conditions.

The metal carbonyl, either preformed, or formed in situ in the manner described above, ordinarily exists as a liquid in equilibrium with its vapor under the reaction conditions and is usually dissolved homogeneously in the reaction mixture. Thus, the mechanism of the catalyst is homogeneous rather than heterogeneous, which would explain the immunity of the reaction to sulfur and carbon monoxide poisoning which is usually present in heterogeneously catalyzed hydrogenation reactions.

Although the reaction mechanism is not completely understood, and it is not known for certain what form or forms of the carbonyl is the active catalyst in the reaction, it is known that some form of the carbonyl of either of these metals must be present in the reaction zone. In the case of cobalt, it is probable that the active catalyst is either dicobalt octacarbonyl $[Co(CO)_4]_2$ or cobalt hydrocarbonyl $HCo(CO)_4$. The existence of both of these compounds is possible under the reaction conditions.

Although only hydrogen takes an active part in the reduction, a mixture of hydrogen and carbon monoxide must be employed. The stoichiometric quantity of hydrogen for complete reduction must of course be present and generally higher yields are obtained when hydrogen in large excess of the stoichiometric amount is present. The carbon monoxide does not directly participate in the reaction, but its presence is necessary to insure the formation and stability of the metal carbonyl catalysts. That is, the partial pressure of carbon monoxide in the reaction zone must be at least sufficient to prevent the decomposition of the metal carbonyl catalyst at the reaction temperature employed or to assure its formation when the carbonyl is formed in situ. The presence of an amount of carbon monoxide less than the concentration necessary to assure the formation and stability of the metal carbonyl will poison the reaction rather than catalyze it.

With these considerations in mind, it is possible to employ mixtures of hydrogen and carbon monoxide containing these gases in ratios ranging from $2H_2:1CO$ to $2OH_2:1CO$. Generally however, mixtures ranging from $1H_2:1CO$ to $4H_2:1CO$ are to be preferred.

The reaction temperature may vary between 70° and 250° C., and preferably between 110° and 200° C. Within these ranges, of course, the optimum temperature for any particular starting material will depend upon the nature of the starting material and the other reaction conditions. At temperatures below 70° C., the rate of reaction is generally too slow to obtain appreciable yields. Above 250° C., excessively high pressures are required to prevent the decomposition of the carbonyl catalyst, and other difficulties appear, such as the formation of excessive amounts of hydrocarbon gases through pyrolysis of the reactants.

Elevated pressures of at least 40 atm. are required for the reaction. Preferably, reaction pressures between 100 and 300 atm. are employed. There is no upper limit to the reaction pressure imposed by limitations of the reaction itself. Generally 10,000 atm. is considered to be the uppermost limit of practical operation. As has been previously stated, the partial pressure of carbon monoxide in the reaction zone must be at least sufficient to prevent the decomposition of the metal carbonyl catalyst, or to insure its formation if it is to be formed in situ from the metal or the metallic salt.

In each of the following examples, which are given to illustrate the invention, an autoclave was employed having a maximum free space when empty of 468 ml. In each example, the catalyst was either a preformed cobalt carbonyl, or a cobalt salt such as cobalt acetate tetrahydrate. The starting compound, together with solvent in some cases, and the catalyst, were charged to the autoclave, which was then pressured at room temperature with from 3000 to 3500 lbs./sq. in. of synthesis gas (mixture of hydrogen and carbon monoxide). The autoclave was then heated with rocking to a temperature of from 180° to 185° C. and kept at this temperature for 1 to 5 hours depending upon the starting material.

The preformed cobalt carbonyl employed in the examples which follow was prepared by reacting cobalt carbonate with synthesis gas. The following is a typical example of this method of preparing the catalyst.

A slurry of 30 g. (0.25 mole) of cobalt carbonate in 100 ml. of benzene was placed in an autoclave and 3.2 moles of synthesis gas ($1H_2:1CO$)

was added until a pressure of 3200 lbs./sq. in. was attained. The autoclave was then heated with rocking to 160° C. within 68 minutes. The maximum pressure recorded was 4230 lbs./sq. in. at 127° C. After heating at 160° C. for 1 hour, the vessel was cooled to 22° C. and the gases discharged. The pressure drop corresponded to approximately 0.9 mole or 3.6 moles of gas absorbed per mole of cobalt carbonate. The clear dark benzene solution of cobalt carbonyl probably dicobalt octacarbonyl [Co(CO)$_4$]$_2$ was pipetted from the bomb and centrifuged. This solution was usually stored at —30° C. in a pressure bottle and used as a stock solution of catalyst. It contained about 0.25 g. of dicobalt octacarbonyl per ml.

*Example 1.—1-methylnaphthalene from 1-naphthalenemethanol*

A solution of 0.45 mole of 1-naphthalenemethanol in 65 ml. of benzene together with 2 g. of dicobalt octacarbonyl [Co(CO)$_4$]$_2$ and 1 g. of CoCO$_3$ were charged in the autoclave. The autoclave was pressured with 3500 lbs./sq. in. of synthesis gas (2H$_2$:1CO) and was then heated with rocking to 180°–185° C. and kept at this temperature for 3 hours. After cooling to room temperature, the contents were discharged and analyzed. 0.32 mole of 1-methylnaphthalene boiling at 123° to 127° C. (23 to 24 mm. Hg) was recovered. This is equivalent to a yield of 72%. 1-methylnaphthalene was identified by the formation of its picrate (melting point of 141.2–142.6° C.) and by its ultraviolet absorption spectrum. The reduction may be represented as follows:

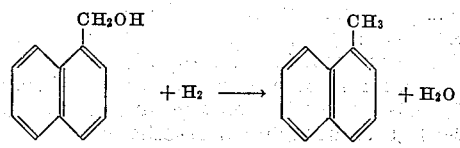

*Example 2.—Ethylbenzene from 1-phenylethanol*

0.75 mole of 1-phenylethanol and 7 g. of cobaltous acetate Co(C$_2$H$_3$O$_2$)$_2$.4H$_2$O were charged to the autoclave which was then pressured with 3500 lbs./sq. in. of synthesis gas (2H$_2$:1CO). The autoclave was then heated with rocking to a temperature of 180° to 185° C. and kept at this temperature for 3 hours. Analysis of the products showed the presence of 0.52 mole of ethylbenzene boiling at 135° to 136° C. (amounting to a yield of 70%). Ethylbenzene was identified by its infrared absorption spectrum. The reaction may be represented as follows:

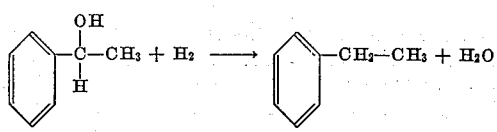

*Example 3.—Diphenylmethane from benzhydrol*

A solution of 0.05 mole of benzhydrol in 70 ml. of benzene together with 5 g. of Co(C$_2$H$_3$O$_2$)$_2$.4H$_2$O were placed in the autoclave. The autoclave was pressured with 3000 lbs./sq. in. of synthesis gas (1H$_2$:1CO), heated with rocking to 180°–185° C., and held at this temperature for 3 hours. Analysis of the products showed the presence of 0.048 mole of diphenylmethane boiling at 105°–108° C. at 4–5 mm. Hg. This amounted to a yield of 95% based upon starting benzhydrol.

Diphenylmethane was identified by its infrared absorption spectrum. The reaction may be represented as follows:

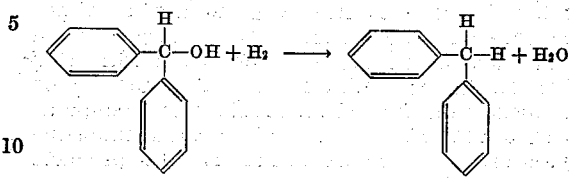

*Example 4.—Triphenylmethane from triphenylcarbinol*

A solution of 0.04 mole of triphenylcarbinol in 94 ml. of benzene together with 7 g. of Co(C$_2$H$_3$O$_2$)$_2$.4H$_2$O

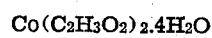

were placed in the autoclave. The autoclave was heated with rocking to a temperature of 180°–185° C. and kept at this temperature for 3 hours. Analysis of the products showed the presence of 0.038 mole of triphenylmethane. This amounted to a yield of 94%. The reaction may be represented as follows:

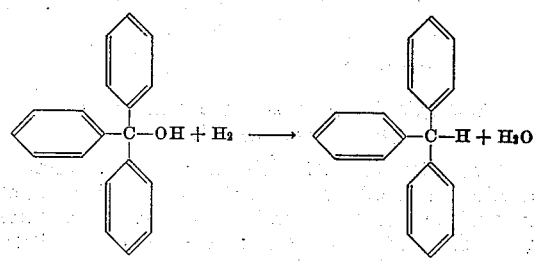

*Example 5.—Diphenylmethane from benzopinacol*

A solution of 0.03 mole of benzopinacol in 93 ml. of benzene together with 7 g. of Co(C$_2$H$_3$O$_2$)$_2$.4H$_2$O

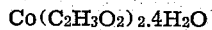

were placed in the autoclave. The autoclave was then pressured with 3000 lbs./sq. in. of synthesis gas (1H$_2$:1CO). The autoclave was then heated with rocking to a temperature of 180°–185° C. and kept at this temperature for 3 hours. Analysis of the product showed the presence of 0.026 mole of diphenylmethane having a M. P. of 25.0°–26.3° C. This amounted to a yield of 89%. Diphenylmethane was identified by its infrared absorption spectrum. A 5% yield of benzophenone was also recovered and identified by formation of its 2,4-dinitrophenylhydrazone (melting point 246.0°–248.5° C.). The reaction may be represented as follows:

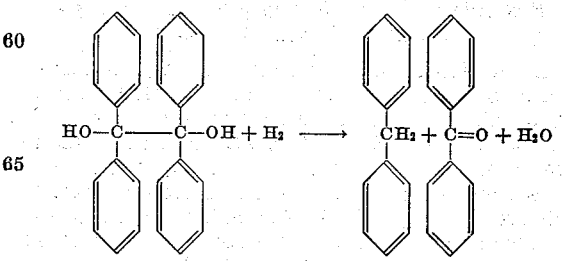

In accordance with its known behavior, on heating, benzopinacol splits into benzhydrol and benzophenone. These then are reduced in accordance with the invention. This explains the presence of small amounts of benzophenone in the reaction products.

Example 6.—p-Methoxytoluene from anisyl alcohol

A solution of 0.6 mole of anisyl alcohol in 15 ml. of benzene, together with 10 g. of cobaltous acetate Co(C₂H₃O₂)₂.4H₂O were charged to an autoclave which was then pressured with 3500 lbs./sq. in. of synthesis gas (2H₂:1CO). The autoclave was heated with rocking to a temperature of 180°-185° C. and maintained at this temperature for 2½ hours. Analysis of the products showed a yield of 16% of p-methoxytoluene and a yield of 44% of 2-(p-methoxyphenyl)-ethanol

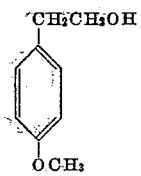

The reduction to p-methoxytoluene may be represented as follows:

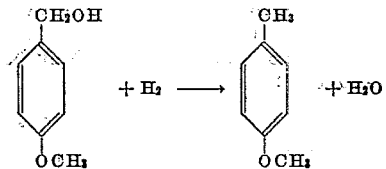

Example 7.—m-Methoxytoluene from m-methoxybenzyl alcohol

A solution of 0.27 mole of m-methoxybenzyl alcohol in 50 ml. of benzene together with 2 g. of dicobalt octacarbonyl and 1 g. of cobalt carbonate were charged to an autoclave which was then pressured with 3500 lbs./sq. in. of synthesis gas (2H₂:1CO). The autoclave was then heated with rocking to 180°-185° C. and maintained at the temperature for 2½ hours. After cooling, analysis of the products showed a yield of 31.2% of m-methoxytoluene and a yield of 32.4% of 2-(m-methoxyphenyl)-ethanol

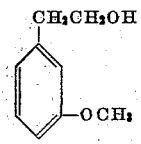

The reduction to m-methoxytoluene may be represented as follows:

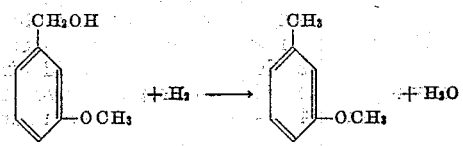

Example 8.—p-Tertiarybutyltoluene from p-tertiarybutylbenzyl alcohol

A solution of 0.40 mole of p-tertiarybutylbenzyl alcohol in 50 ml. of benzene together with 2 g. of dicobalt octacarbonyl and 1 g. of cobalt carbonate were charged to an autoclave which was then pressured with 3500 lbs./sq. in. of synthesis gas (2H₂:1CO). The autoclave was heated with rocking to 180°-185° C. and kept at this temperature for 4 hours. After cooling, analysis of the products showed a yield of 47% of p-tertiarybutyltoluene and a 24% yield of 2-(p-tertiarybutyl)-ethanol

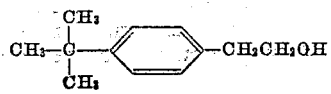

The reduction to p-tertiarybutyltoluene may be represented as follows:

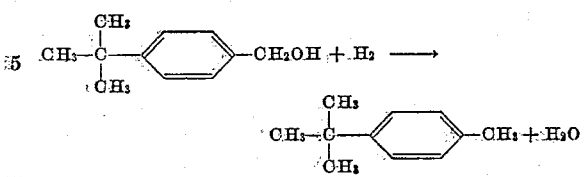

Example 9.—p-Carboethoxytoluene from p-carboethoxybenzyl alcohol

A solutoin of 0.35 mole of p-carboethoxybenzyl alcohol in 50 ml. of benzene together with 4 g. of dicobalt octacarbonyl and 1 g. of cobalt carbonate were charged to an autoclave which was then pressured with 3300 lbs./sq. in. of synthesis gas (2H₂:1CO). The autoclave was then heated with rocking to a temperature of 180°-185° C. and kept at this temperature for 3 hours. Analysis of the products showed a yield of 32% of p-carboethoxytoluene. This reaction may be represented as follows:

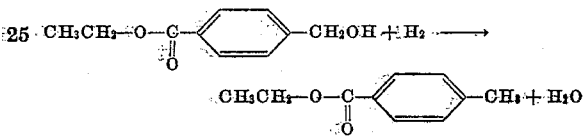

Example 10.—1,2,3,5-tetramethylbenzene from mesityl carbinol

A solution of 0.32 mole of mesityl carbinol in 100 ml. of benzene together with 2 g. of dicobalt octacarbonyl and 1 g. of cobalt carbonate were charged ot an autoclave which was then pressured with 3500 lbs./sq. in. of synthesis gas (2H₂:1CO). The autoclave was then heated with rocking to a temperature of 180°-185° C. and held at that temperature for 2½ hours. After cooling, analysis of products showed a yield of 58% of 1,2,3,5-tetramethylbenzene and an 18% yield of 2-(2,4,6-trimethylphenyl)-ethanol

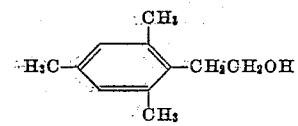

The reduction to 1,2,3,5-tetramethylbenzene may be represented as follows:

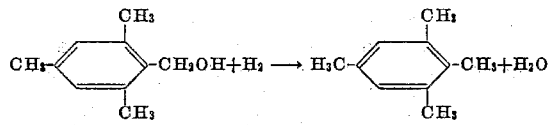

Example 11.—Toluene from benzaldehyde 1.3 moles of benzaldehyde together with 7 g. of cobaltous acetate Co[C₂H₃O₂]₂.4H₂O was charged to an autoclave which was then pressured with 3200 p. s. i. of synthesis gas (1H₂:1CO). The autoclave was heated, with rocking, to 180°-185° C. and kept at this temperature for 45 minutes. Analysis of the products showed a 5% yield of toluene boiling at 109°-110° C. Toluene was identified by its infrared absorption spectrum. 43% of dibenzyl ether was also recovered. The reduction to toluene may be represented as follows:

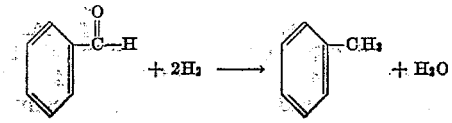

Example 12.—Ethylbenzene from acetophenone

One mole of acetophenone together with 7 g. of $Co(C_2H_3O_2)_2.4H_2O$ were charged to an autoclave which was then pressured with 3000 lbs./sq. in. of synthesis gas ($1H_2:1CO$). The autoclave was then heated with rocking to 180°–185° C. and kept at that temperature for 1 hour. Analysis of the reaction products showed the presence of .53 mole of ethylbenzene boiling at 135°–136° C. This amounted to a yield of 53%. Ethylbenzene was identified by its infrared absorption spectrum. The reaction may be represented as follows:

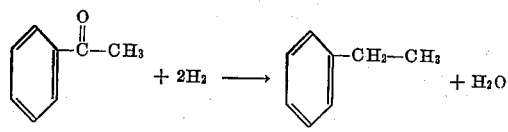

Example 13.—Ethylbenzene from acetophenone

Example 12 was repeated except that a synthesis gas having a composition of $2H_2:1CO$ was used and the autoclave was kept at reaction temperature for 3 hours instead of 1 hour. The yield of ethylbenzene increased from the 53% obtained in Example 12 to 67%.

Example 14.—p-Ethylanisole from p-methoxyacetophenone 0.70 mole of p-methoxyacetophenone dissolved in 20 ml. of benzene, together with 2 g. of dicobalt octacarbonyl and 1 g. of $CoCO_3$ were charged to an autoclave which was then pressured with 3500 lbs./sq. in. of synthesis gas ($2H_2:1CO$). The autoclave was then heated with rocking to 180°–185° C. and kept at this temperature for 4 hours. After cooling the products were analyzed. 0.64 mole of p-ethylanisole boiling at 193°–194° C. were recovered amounting to a yield of 91%. 0.042 mole of 2-(p-methoxyphenyl)-propanol-1 was also

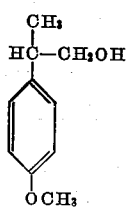

recovered amounting to a yield of 6%. This alcohol was identified by preparation of its α-naphthylurethan (melting point 109.1°–110.0° C.) which was identical with that prepared from the alcohol obtained by lithium aluminum hydride reduction of the corresponding aldehyde. The principal reaction may be represented as follows:

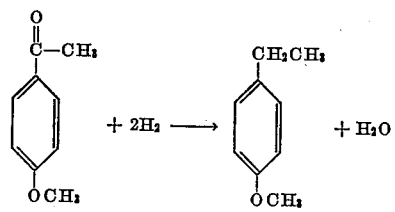

Example 15.—Diphenylmethane from benzophenone

A solution of 0.60 mole of benzophenone in 90 ml. of benzene, together with 7 g. of $Co(C_2H_3O_2)_2.4H_2O$ were charged to an autoclave which was then pressured with 3000 lbs./sq. in. of synthesis gas ($1H_2:1CO$). The autoclave was then heated with rocking to 180°–185° C. and kept at that temperature for 2 hours. Analysis of the products showed the presence of 0.516 mole of diphenylmethane (M. P. 25.5–26.5° C.) amounting to a yield of 86%. Diphenylmethane was identified by its infrared absorption spectrum. The reaction may be represented as follows:

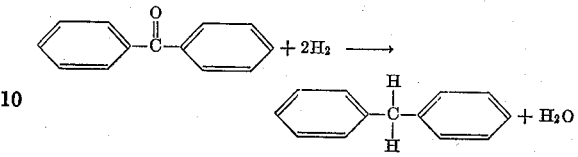

Example 16.—Fluorene from fluorenone

A solution of 0.06 mole of fluorenone in 60 ml. of benzene, together with 7 g. of cobaltous acetate $Co(C_2H_3O_2)_2.4H_2O$ were placed in a glass liner which was then inserted in the autoclave. The autoclave was pressured with 3000 lbs./sq. in. of synthesis gas ($2H_2:1CO$) and was then heated with rocking to 180°–185° C. and kept at this temperature for 4 hours. Analysis of the products showed the presence of 0.57 mole of fluorene (melting point 114.2°–115.4° C.) amounting to a 95% yield. Fluorene was identified by its ultraviolet absorption spectrum. A 2% yield of 9-fluorenol

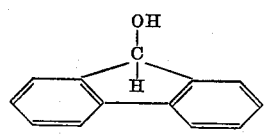

(M. P. 154.0°–154.8° C.) was also recovered. The principal reaction may be represented as follows:

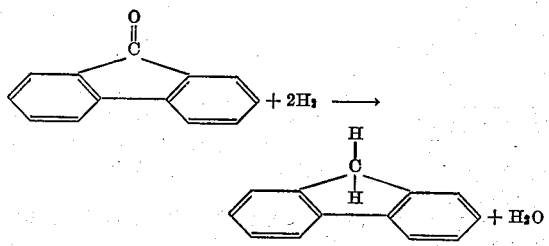

It will be noted that in some of the above examples involving the reduction of an alcohol, a substantial proportion of the starting alcohol, instead of undergoing reduction, is converted to its next higher homolog by insertion of a methylene group in the carbon chain adjacent the alcoholic hydroxy group. Instances of this behavior can be noted in Examples 6, 7, 8, and 10 involving the reduction of various derivatives of benzyl alcohol. This homologation to the next higher alcohol is a competing reaction which occurs under the same conditions as the reduction reaction. This reaction is described in copending application Ser. No. 124,938, filed November 1, 1949, for the Method for Lengthening the Carbon Chain of Compounds Containing an Alcoholic Hydroxy Group by Irving Wender and Milton Orchin. The yield of the reduced aromatic compound as compared to the yield of the next higher homoglous alcohol depends upon the particular aromatic alcohol involved. In some cases, as with some substituted benzyl alcohols, the homologation reaction giving the next higher homoglous alcohol predominates. However, in the case of secondary and tertiary alcohols where the carbon atom containing the hydroxy group is α to at least one aromatic nucleus, as in benzhydrol (Example 3) or triphenylcarbinol (Example 4) or 1-phenylethanol (Example 2), the reduction reaction proceeds almost to the complete exclusion of the homologation reaction.

For this reason, it is apparent that the invention is particularly applicable to secondary and tertiary alcohols of this type.

In the case of the aromatic aldehydes and ketones which undergo reduction in accordance with the invention, in some cases a portion of the starting material undergoes only partial reduction to the corresponding alcohol while the remainder is completely reduced. Thus, in Example 11, the major portion of the starting benzaldehyde was converted to dibenzyl ether (produced by reduction to benzyl alcohol and the subsequent dehydration of the alcohol to yield dibenzyl ether) while only a 5% yield of toluene was recovered. Likewise, in Examples 14 and 16 a small percentage of the alcohol corresponding to the starting ketone was recovered. In general the yield of completely reduced product can be increased by maintaining a high concentration of hydrogen in the reaction zone, and conversely partial reduction to the alcohol can be favored by decreasing the concentration of hydrogen.

From the above description, it is apparent that the present invention provides a convenient and easy method for completely reducing many oxygenated, aromatic compounds where the oxygenated function is α to the aromatic nucleous. In most cases the reduction proceeds readily and with good yields. The catalysts for the reduction are cheap and, if formed in situ from the metal or a salt, need no preparation at all. Technical grade salts of cobalt or iron can be used without purification. Cheap hydrogenating gases such as unpurified water gas, or coke oven gas may be employed instead of expensive, carefully purified hydrogen.

It is to be understood that the above description, together with the specific examples and embodiments described, is intended merely to illustrate the invention, and that the invention is not to be limited thereto, nor in any way except by the scope of the appended claims.

We claim:

1. A process for reducing the hydroxyl group in an aromatic carbinol to hydrogen according to the reaction

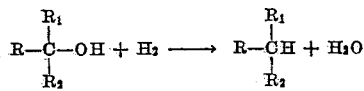

wherein R is an aromatic radical, and $R_1$ and $R_2$ are selected from the group consisting of hydrogen and aryl, alkyl, aralkyl, cycloaliphatic, and heterocyclic radicals, comprising the steps of reacting said compound with $H_2$ in the presence of a catalyst selected from the group consisting of carbonyls of cobalt and iron, at a temperature of from about 70°–250° C., and under a pressure of at least 40 atm., while maintaining a concentration of CO in the reaction zone sufficient to prevent the decomposition of said carbonyl catalyst under reaction conditions.

2. A method in accordance with claim 1 in which said catalyst is cobalt carbonyl and in which the reaction zone is maintained at a temperature of from about 110°–200° C. and under a pressure of from about 100–300 atm.

3. A process of reducing to a methyl group the carbinol group in an aromatic carbinol comprising the steps of reacting said aromatic carbinol with hydrogen in the presence of a catalyst selected from the group consisting of iron carbonyl and cobalt carbonyl, at a temperature of from about 70°–250° C., and under a pressure of at least 40 atmospheres, while maintaining a concentration of CO in the reaction zone sufficient to prevent the decomposition of said carbonyl catalyst under the reaction conditions.

4. A method in accordance with claim 3 in which said catalyst is cobalt carbonyl and the reaction zone is maintained at a temperature of from about 110°–200° C. and under a pressure of from 100–300 atm.

5. A process in accordance with claim 3 wherein 1-naphthalenemethanol is reduced to 1-methylnaphthalene.

6. A process in accordance with claim 3 wherein 1-phenylmethanol is reduced to ethylbenzene.

7. A process in accordance with claim 3 wherein anisyl alcohol is reduced to p-methoxytoluene.

8. A process in accordance with claim 3 wherein m-methoxybenzyl alcohol is reduced to m-methoxytoluene.

9. A process in accordance with claim 3 wherein p-tert-butyl benzyl alcohol is reduced to p-tert-butyltoluene.

References Cited in the file of this patent

UNITED STATES PATENTS

| Number | Name | Date |
|---|---|---|
| 2,437,600 | Gresham et al. | Mar. 9, 1948 |
| 2,614,107 | Wender et al. | Oct. 14, 1952 |

OTHER REFERENCES

Wender et al.: Jour. Amer. Chem. Soc., vol. 72, pages 4375–8 (4 pages), (October 1950).